(12) United States Patent
Gong

(10) Patent No.: US 10,781,124 B2
(45) Date of Patent: Sep. 22, 2020

(54) PRODUCTION METHOD OF SELF-FITTING NANO CATALYTIC WASTEWATER TREATMENT AGENT

(71) Applicants: CHENGDU QIANLIJIN TECHNOLOGICAL INNOVATION CO., LTD., Chengdu (CN); NINGBO XINFU TITANIUM DIOXIDE CO., LTD., Ningbo (CN)

(72) Inventor: Jiazhu Gong, Chengdu (CN)

( * ) Notice: Subject to any disclaimer, the term of this patent is extended or adjusted under 35 U.S.C. 154(b) by 0 days.

(21) Appl. No.: 16/278,728

(22) Filed: Feb. 19, 2019

(65) Prior Publication Data

US 2020/0231481 A1    Jul. 23, 2020

Related U.S. Application Data

(63) Continuation of application No. PCT/CN2019/072734, filed on Jan. 22, 2019.

(51) Int. Cl.

| | |
|---|---|
| C02F 9/00 | (2006.01) |
| B01J 21/06 | (2006.01) |
| B01J 35/00 | (2006.01) |
| C01G 23/053 | (2006.01) |
| C02F 1/66 | (2006.01) |
| C02F 1/72 | (2006.01) |
| C02F 1/52 | (2006.01) |

(Continued)

(52) U.S. Cl.
CPC ............... *C02F 9/00* (2013.01); *B01J 21/063* (2013.01); *B01J 35/0013* (2013.01); *C01G 23/0532* (2013.01); *C01P 2004/64* (2013.01); *C02F 1/325* (2013.01); *C02F 1/52* (2013.01); *C02F 1/66* (2013.01); *C02F 1/725* (2013.01); *C02F 1/74* (2013.01); *C02F 2101/308* (2013.01); *C02F 2303/18* (2013.01); *C02F 2305/08* (2013.01)

(58) Field of Classification Search
CPC .... C02F 1/725; C02F 9/00; C02F 1/52; C02F 1/66; B01J 35/004; B01J 20/06
See application file for complete search history.

(56) References Cited

U.S. PATENT DOCUMENTS

| | | | |
|---|---|---|---|
| 6,919,029 B2 * | 7/2005 | Meng | B01J 20/06 |
| | | | 210/665 |
| 2003/0085172 A1 | 5/2003 | Yamasaki | |

(Continued)

*Primary Examiner* — Claire A Norris
(74) *Attorney, Agent, or Firm* — Epson IP (Nelson IP)

(57) ABSTRACT

The method in the disclosure is achieved by chemically reacting diluted sulfuric acid generated when industrial sulfate titanium white powder production with a titanium raw material, and controlling an acid/titanium ratio and an iron/titanium ratio so as to produce the nano catalytic wastewater treatment agent. When being used for treatment of dyeing wastewater and other alkaline wastewater, by virtue of alkaline and dilution environment in wastewater, the nano catalytic wastewater treatment agent is subjected to self-fitting hydrolysist to produce a new ecological nano titanium dioxide ultrafine particle as a catalyst for decomposing organic matters in wastewater so as to decompose the organic matters into carbon dioxide and water; a decomposed and oxidized hydrated iron compound is used as a flocculation and adsorption nano particle, achieving the purpose of removing organic matters in wastewater.

11 Claims, 2 Drawing Sheets

(51) Int. Cl.
    *C02F 1/74* (2006.01)
    *C02F 1/32* (2006.01)
    *C02F 101/30* (2006.01)

(56) References Cited

U.S. PATENT DOCUMENTS

| | | | |
|---|---|---|---|
| 2012/0223018 A1* | 9/2012 | Iang | C02F 9/00 |
| | | | 210/652 |
| 2013/0206692 A1 | 8/2013 | Zhang | |
| 2015/0283418 A1* | 10/2015 | Kometani | B01J 23/72 |
| | | | 588/316 |
| 2017/0327389 A1* | 11/2017 | Kisailus | C02F 1/325 |

* cited by examiner

PRODUCTION METHOD OF SELF-FITTING NANO CATALYTIC WASTEWATER TREATMENT AGENT

CROSS-REFERENCE TO RELATED APPLICATIONS

This application is a continuation of International Patent Application No. PCT/CN2019/072734 with a filing date of Jan. 22, 2019, designating the United States, now pending. The content of the aforementioned applications, including any intervening amendments thereto, are incorporated herein by reference.

TECHNICAL FIELD

The disclosure relates to a production method of wastewater treatment agents, and particularly relates to a resource utilization and production method of a dyeing wastewater catalytic treatment agent and wastes when nano catalytic titanium dioxide production.

BACKGROUND OF THE PRESENT INVENTION

When wastewater treatment is carried out to remove organic matters, the existing typical method, a Fenton's reagent method for catalytically decomposing organic matters, is generally adopted, namely, ferrous ions react with hydrogen peroxide molecules to produce hydroxyl radicals (OH·), the hydroxyl radicals continue to react with hydrogen peroxide to produce peroxy hydroxyl radicals ($HO_2·$). The hydroxyl radical has an oxidation potential of up to 2.73V, and is subjected to free concerted catalytic oxidation together with the peroxy hydroxyl radicals, so that aroma compounds that are difficultly oxidized by a common reagent and some heterocyclic compounds are all non-selectively oxidized and degraded in the presence of the Fenton's reagent. Its primary chemical reaction principle is as follows:

$$Fe^{2+}+H_2O_2 \rightarrow Fe^{3+}+OH^-+OH· \quad (1)$$

$$OH·+H_2O_2 \rightarrow HO_2·+H_2O \quad (2)$$

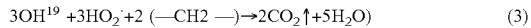

$$3OH^{19}·+3HO_2·+2(-CH2-)\rightarrow 2CO_2\uparrow+5H_2O \quad (3)$$

Thus, when organic matters in wastewater are treated with the Fenton's reagent, abundant commercial hydrogen peroxide ($H_2O_2$) and ferrous sulfate need to be used according to reaction formulas (1) and (2). Meanwhile, in order to render the reaction formula (1) to be further carried out toward the right to obtain hydroxyl radicals, hydroxyl ($OH^-$) ions generated by reaction need to ceaselessly move, namely, the pH value of reaction is controlled by using a large amount of high-concentration commercial sulfuric acid containing 98% $H_2SO_4$ on the site of treatment. The concentration of concentrated sulfuric acid also needs to be diluted for use. This can cause expansive cost and also brings safety potential safety hazard for production and operation.

However, due to the presence of grid defects and activation points on a surface, nano titanium dioxide has a reaction-catalyzing characteristic, can directly catalytically oxidize a water molecule into a hydroxyl radical (OH.) and peroxy hydroxyl radicals ($HO_2·$), so as to achieve the effect of hydrogen peroxide, thereby replacing and reducing the usage of hydrogen peroxide ($H_2O_2$). A selective catalytic reduction (SCR) material for desulfuration and denitrification in the existing thermal power plant, an automobile exhaust catalyst, self-cleaning glass and the like are all new materials formed based on the catalytic performance of nano titanium dioxide ($TiO_2$). A catalytic mechanism of nano titanium dioxide comprises the following main reaction processes:

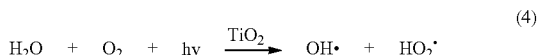

$$H_2O + O_2 + h\nu \xrightarrow{TiO_2} OH· + HO_2· \quad (4)$$

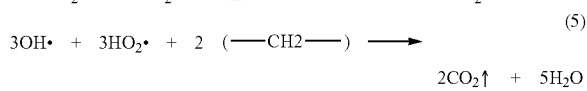

$$3OH· + 3HO_2· + 2(-CH2-) \longrightarrow 2CO_2\uparrow + 5H_2O \quad (5)$$

Hence, a water molecule ($H_2O$) and an oxygen molecule ($O_2$) are directly subjected to a catalytic reaction by virtue of energy of light according to a reaction formula (4) under a catalytic reaction with nano $TiO_2$ so as to obtain hydroxyl radicals (OH·) and peroxy hydroxyl radicals ($HO_2·$), thereby achieving the purpose of using hydrogen peroxide ($H_2O_2$) by a Fenton's wastewater treatment agent and replacing or reducing the usage amount of hydrogen peroxide.

However, there are many nano $TiO_2$ production methods, comprising a liquid phase production method, a solid phase production method and a gas phase production method. Due to a fact that the solid phase method and the liquid phase method have complicated technology, high equipment requirement, price factor influence, they seriously hinder the generated $TiO_2$ product to be used as a wastewater treatment catalyst; for the liquid phase method, especially, production of a nano $TiO_2$ catalyst using an intermediate product produced from sulfate titanium white powder, similarly, tedious technology, many processing equipment and a large amount of auxiliary raw materials to be produced and consumed cause expansive production cost; especially, ultrathin nano $TiO_2$ particles are difficult to separate and wash, so they difficultly enter a market of wastewater treatment agents.

As described in U.S. Pat. No. 8,182,602 B2 (Preparation Method of High-Dispersion Microcrystal Titanium Dioxide), (Example 1) an intermediate metatitanic acid produced by using a sulfuric acid method is used to be prepared into 350 g/L $TiO_2$ slurry, alkali liquor having a concentration of 700 g/L NaOH is added, a neutralization reaction is carried out at 60° C. for 2 h and the temperature is raised to 90° C. to obtain sodium titanate solid, and filtration and washing are carried out until sulfate ions are not present; the sodium titanate filter cake solid is subjected to slurry mixing to be prepared into slurry having a concentration of 180 g/L $TiO_2$, an acidification reaction is carried out by adding 30 g/L hydrochloric acid having a concentration of 30% HCl for 2 h at a reaction temperature of 90° C., and the obtained products are neutralized with sodium carbonate until a pH value is 4.7, subsequently filtered and washed with four-fold distilled water; the washed filter cake is prepared into slurry and added with 0.2-1% $KH_2PO_4$ auxiliary agent for 4 h, the obtained product is fed to a rotary kiln to be calcined at 720° C. to obtain 10-50 nm calcined product particles, nano $TiO_2$ prepared by calcination is then sanded and posttreated to obtain a high-dispersion rutile-shaped $TiO_2$ product having a grain diameter of 60 nanometer.

In the sulfate titanium white powder production of this patent, metatianic acid is obtained via multi-segment separation and purification, the technology is every tedious, needs many production equipment and is tedious in operation, see FIG. 1 in the patent, 10 steps in total, and furthermore, a lot amount of sodium hydroxide, hydrochloric acid and distilled water are used.

Also as described in U.S. Pat. No. 7,521, 039 B2 (Light Catalytic Titanium Dioxide), (Example 2) in order to obtain nano catalytic $TiO_2$, metatianic acid (hydrated titanium dioxide) obtained by using titanyl sulfate pyrohydrolysis reacts with sodium hydroxide to prepare sodium titanate, then sodium titanate is filtered and washed with water, and washed again with hydrochloric acid solution having pH=3 until sulfate ions and sodium ions are not present; the prepared sodium titanate filter cake is mixed with 70 g/L HCl solution to react for 60 minutes at a heating temperature of 90° C., the obtained product is cooled to obtain nano $TiO_2$ particles having a grain diameter of (80-100)×10×10 nanometer. Another method (Example 6) is as follows: $TiOCl_2$ solution is added into sodium hydroxide solution, the obtained product is cooled after the pH value of the solution is up to 0.5, the temperature is 80° C. and the time is 2 h, then is washed with deionized water, and then dried at 120° C.; nano $TiO_2$ is 115-139 $m^2/g$ in specific surface area and has high catalytic performance, but, the product calcined at 600° C. is only between 32-44.7 $m^2/g$ in specific surface area and has relatively low catalytic performance. In this invention patent, nano catalytic $TiO_2$ is as well prepared by using metatitanic acid hydrolyzed, precipitated and washed with a sulfuric acid method, the technology is tedious and complicated in operation, and large amounts of sodium hydroxide, hydrochloric acid and deionized water are also used.

Also as described in America Patent U.S. Pat. No. 6,919, 029 B2 (Method For Preparing Water Treatment Surfactant Titanium Dioxide), (Example 1) like the previous two patents, metatitanic acid slurry is obtained via hydrolysis, separation and washing in sulfate titanium white powder production and then is neutralized with sodium hydroxide until pH is 4-9, then the obtained product is filtered and washed to remove salts therein, the obtained solid filter cake is dried for 2 h within a temperature range of 105-700° C. The titanium dioxide particle obtained via analysis is an aggregate with a particle diameter range of 6.6-10.89 nm, and the product, as the surfactant, is used for adsorbing harmful substances and harmful metal ions in water. In this patent, titanium dioxide having surface activity is prepared, similarly, the technology is complicated, and sodium hydroxide is used for neutralization; filtration, washing and drying are also required, and metatitanic acid from sulfate titanium white powder production is used as a raw material, and the product can only be used as an adsorbent.

In the production technology of sulfate titanium white powder, as shown in FIG. 2, the obtained filtrate is about 20-25% diluted sulfuric acid when metatitanic acid is hydrolyzed and filtered, and its compositions are seen in FIG. 2. In order to utilize these diluted sulfuric acid resources, they are used for producing polyferric sulfate (PFS) in the field of wastewater treatment agents, oxygen or air is blown for oxidative polymerization in the presence of catalyst sodium nitrite to obtain polyferric sulfate (basic ferric sulfate) as a flocculant for wastewater treatment. Its main chemical reaction is as follows:

$2FeSO_4 + NaNO_2 + H_2SO_4 \rightarrow 2Fe(OH)SO_4 + Na_2SO_4 + 2NO$ \hfill (6)

$NO + O_2 \rightarrow NO_2$ \hfill (7)

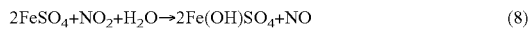

$2FeSO_4 + NO_2 + H_2O \rightarrow 2Fe(OH)SO_4 + NO$ \hfill (8)

Also, in Chinese Patent CN1202989C "Concentration And Decontamination Production Method Of Diluted Sulfuric Acid" and Patent CN100581994C "Concentration And Decontamination Production Method of Diluted Sulfuric Acid In Production Process of Titanium Dioxide Using Sulfuric Acid Method", diluted sulfuric acid containing ferrous sulfate is concentrated and separated through a patent concentration process, the recovered concentrated sulfuric acid is returned back to titanium white powder production or is used for phosphorous chemical production to replace commercial sulfuric acid as a raw material, the produced ferrous sulphate monohydrate replaces a sulfur resource to be used for sulfuric acid production, so as to gain good social benefits and economic benefits; however, separated ferrous sulphate monohydrate can be subjected to blending combustion only as a raw material for preparing sulfuric acid from brasses, while most sulfuric acid productions with titanium white powder as a raw material is production with sulphur as a raw material, the process device sulphur burning furnace is poorer than a furnace in fluid bed and is difficultly used for blending combustion. Byproduct diluted sulfuric acid from sulfuate titanium white powder is coupled with a titanium raw material to produce a self-fitting nano catalytic wastewater treatment agent for decomposing organic matters in wastewater. There is no reports that a production technology and treatment method adopting the traditional Fenton's reagent is replaced.

TABLE 1

Table For Main Compositions Of Diluted Sulfuric Acid

| Components | Contents (%) | Components | Components (%) |
|---|---|---|---|
| $H_2SO_4$ | 23.30 | $Al_2(SO_4)_3$ | 0.68 |
| $FeSO_4$ | 10.70 | $Ti(SO_4)_2$ | 0.45 |
| $MgSO_4$ | 1.20 | | |

| Components | Components (%) | Components | Components (%) |
|---|---|---|---|
| $H_2SO_4$ | 23.30 | $Al_2(SO_4)_3$ | 0.68 |
| $FeSO_4$ | 10.70 | $Ti(SO_4)_2$ | 0.45 |
| $MgSO_4$ | 1.20 | | |
| $H_2SO_4$ | 23.30 | $Al_2(SO_4)_3$ | 0.68 |
| $FeSO_4$ | 10.70 | $Ti(SO_4)_2$ | 0.45 |
| $MgSO_4$ | 1.20 | | |

Note:
the density of diluted sulfuric acid is 1.341 $g/cm^3$.

SUMMARY OF PRESENT INVENTION

In order to couple diluted sulfuric acid generated in the existing sulfate titanium white powder production with a titanium raw material, expand the use of a produced waste byproduct resource, overcome a shortage that a large amount of commercial sulfuric acid and hydrogen peroxide (oxydol) are needed when organic matters in wastewater are decomposed with the existing Fenton's wastewater treatment agent, simplify the tedious flow procedure of the existing catalytic nano TiO2 production technology and solve the defects of complicated equipment and tedious operation, the objective of the disclosure is to provide a production and treatment method of a self-fitting nano catalytic wastewater treatment agent. The method is a method by which the byproduct diluted sulfuric acid from sulfate titanium white powder reacts with a titanium raw material to prepare a multi-component solution product with a ratio of sulfuric acid to titanium sulfate [$H_2SO_4/Ti(SO_4)_2$] and a ratio of sulfuric acid to ferrous sulfate ($H_2SO_4/FeSO_4$), so that a precipitation reaction occurs while adding a treatment agent for wastewater treatment to generate ultrafine new ecological nano $TiO_2$ which is a catalytic active agent having a high specific surface area and a high dispersion phase, thereby meeting higher catalytic efficiency, reducing and eliminating the usage amount of hydrogen peroxide, shortening wastewater decomposition time and decomposing and eliminating, organic matters in wastewater. Compared with the existing technology for decomposing organic matters in wastewater with a Fenton method, a production and treatment method of a self-fitting nano catalytic wastewater treatment agent protected by the disclosure not only exploits the new use of byproduct diluted sulfuric acid from sulfate titanium white powder production but also saves the use of Fenton's commercial sulfuric acid and hydrogen peroxide. The method of the disclosure not only simplifies synthesis production technology of nano $TiO_2$ as a wastewater treatment agent, eliminates tedious production flow and complicated equipment for preparing nano $TiO_2$, reduces and saves the input of producing auxiliary materials, and saves production cost. Also due to use of the self-fitting nano catalytic treatment agent, the existing Fenton organic matter wastewater treatment process is simplified, and potential safety hazards for dilution of commercial sulfuric acid and storage and transportation of hydrogen peroxide are eliminated; byproduct sulfuric acid from sulfate titanium white powder production and the titanium raw material are processed into an environmental-friendly water treatment agent via coupling, thereby enlarging the use of produced waste byproduct resources and overcoming the market limitation and shortage of the existing utilization method of the produced polyferric sulfate single water treatment agent, improving the utilization and reuse rates of resources, increasing the economic benefits of a producer, and achieving the economic purpose of coupling and recycling of waste side resources produced from sulfate titanium white powder production.

The production principle of the disclosure is as follows:

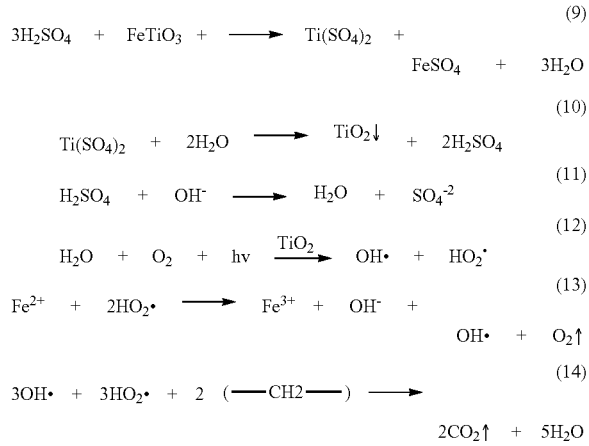

Byproduct diluted sulfuric acid from titanium white powder production and the titanium raw material are produced into a material with a ratio of acid to titanium [$H_2SO_4$/Ti$(SO_4)_2$] and a ratio of acid to iron ($H_2SO_4$/$FeSO_4$) according to demand to react to prepare self-fitting nano catalytic wastewater treatment liquor (reaction formula 9), and nano $TiO_2$ is generated according to a reaction formula (10) due to dilution and hydrolysis when wastewater treatment; sulfuric acid released from reaction is neutralized by an alkaline substance ($OH^-$) in wastewater to produce hydrated sulfate (reaction formula 11); new ecological nano $TiO_2$ is subjected to catalytic reaction in the presence of light and blown air to generate hydroxyl radicals ($HO^{\cdot}$) and peroxy hydrooxyl radical ($HO_2^{\cdot}$) according to a reaction formula (12); 2 molecules of peroxy hydrooxyl radicals ($HO_2^{\cdot}$) react with ferrous sulfate in the treatment agent according to a reaction formula (13) to generate trivalent iron ions, hydroxyls, hydroxyl radicals and oxygen; finally, hydroxyl radicals ($HO^{\cdot}$) and peroxy hydrooxyl radical ($HO_2^{\cdot}$) generated in wastewater cooperatively decompose organic matters in wastewater into $CO_2$ and $H_2O$ according to a reaction formula (14).

The technical solution of the disclosure is as follows:

Byproduct diluted sulfuric acid from sulfate titanium white powder production is prepared into titanium mineral powder with a mass ratio of sulfuric acid to titanium sulfate [$H_2SO_4$/$TiSO_4$] and a mass ratio of sulfuric acid to ferrous sulfate ($H_2SO_4$/$FeSO_4$) as a raw material according to demand, and simultaneously, the titanium mineral powder is added into a continuous reaction tank R1 for decomposition reaction, and the obtained product overflows into a reaction tank R2 for reaction, and then the resultant product overflows into a reaction tank R3 for reaction; material liquid obtained after completely reaction is fed with a pump P1 into a cyclone C for cyclonic separation, the heavy phase bed charge separated via the cyclone is returned back to the reaction tank R1 to further react, and clear liquid, namely self-fitting nano catalytic wastewater treatment agent, enters a storage tank T1; and then the self-fitting nano catalytic wastewater treatment agent is pumped into a tank car T2 with a discharge pump P2 to be fed to a wastewater treatment station.

After the prepared self-fitting nano catalytic wastewater treatment agent is fed to the wastewater treatment station, it is directly fed to the existing storage tank of diluted sulfuric acid diluted by commercial concentrated sulfuric acid, so that the original commercial sulfuric acid dilution operation is omitted and ferrous sulfate solution does not need to be added and prepared. Production and operation are carried out according to the original Fenton method: step 1, regulating the pH value of wastewater to 3.5 using the self-fitting nano catalytic treatment agent, new ecological ultrfine nano $TiO_2$ is titanium sulfate in the treatment agent generated from titanium sulfate in the treatment agent and evenly dispersed in the treated wastewater; step 2, feeding the wastewater whose pH value is regulated and in which nano $TiO_2$ has been generated by fitting into a decomposition pool, radiating the wastewater by virtue of sun light or an artificial light source, and blowing air for oxidative decomposition; step 3, adding alkali liquor to regulate the pH value of the treated wastewater feed liquid to 7, adding a flocculant for precipitation and clarification, settling thick slurry and feeding sludge to be filtered, wherein, clear liquid is wastewater which is qualified and discharged after treatment, or recycled.

Compared with the existing Fenton's wastewater treatment agent and nano titanium dioxide production technology, the self-fitting nano catalytic wastewater treatment agent production and treatment method protected by the disclosure saves the usage amounts of Fenton's commercial sulfuric acid and hydrogen peroxide, explores the new use of byproduct diluted sulfuric acid from sulfate titanium white powder production, simplifies the synthesis and production technology of nano $TiO_2$ as a wastewater treatment catalyst, eliminates the tedious production flow and fussy equipment for preparing nano $TiO_2$, reduces and saves the input of auxiliary production and saves production cost; moreover, due to use of the self-fitting nano catalytic treatment agent, the production process of the Fenton organic matter wastewater treatment is simplified, the utilization and reuse rates of the resources are improved, the economic benefits of a producer are increased, and an economic purpose of recycling, coupling and reuse of the sulfate titanium white powder byproduct waste resource is achieved.

Preferably, the diluted sulfuric acid is waste sulfuric acid which is used for for industrial production and required for reuse and treatment.

Preferably, the diluted sulfuric acid is diluted sulfuric acid generated in sulfate titanium white powder production, wherein, the diluted sulfuric acid contains a lot amount of ferrous sulfate and a few amount of other metal sulfates; the concentration range of the diluted sulfuric acid is 15-30%, more preferably 20-25%, most preferably 23%.

Preferably, the titanium raw material comprises ilmenite, acid-soluble titanium slag, an intermediate product obtained in sulfate titanium white powder production and titanium-containing castaway slag cleared from production and overhaul engineering, preferably, ilmenite.

Preferably, the reactive tanks R1-R3 can be single reactors with stirring, or multiple tandem reactors with stirring.

Preferably, a material mass ratio $[H_2SO_4/Ti(SO_4)_2]$ of the diluted sulfuric acid to the titanium raw material in the self-fitting nano catalytic wastewater treatment agent product is 100:(0.5-2.0), more preferably 100:(1.0-1.5), most preferably 100:1.3.

Preferably, in the self-fitting nano catalytic wastewater treatment agent product, the content of titanium sulfate is 0.5-2.5%, more preferably 1.2-2.1%, most preferably 1.8%; the mass ratio of sulfuric acid to titanium sulfate $[H_2SO_4/Ti(SO4)_2]$ is 8.0-50, most preferably 10-20.

Preferably, in the self-fitting nano catalytic wastewater treatment agent product, the content of ferrous sulfate is 5-15%, more preferably 9-12%, most preferably 11.5; the mass ratio of sulfuric acid to ferrous sulfate $(H_2SO_4/Fe(SO_4))$ is 1.5-3.5, more preferably 2.0-2.5, most preferably 2.

Preferably, the temperature of the decomposition reaction of the diluted sulfuric acid and the titanium raw material is 0-50° C., more preferably 20-35° C., most preferably 30° C.

Preferably, in the reactive tanks, the total standing time (reaction time) of the reaction materials is 1-5 h, more preferably 2-3 h, most preferably 2.5 h.

Preferably, the ratio of the heavy phase bed charge which is obtained after cyclonic separation via the cyclone and returns back to the reactive tank is 1.0-3.0%, more preferably 1.8-2.2%, most preferably 2%, of the total material.

Preferably, when the self-fitting nano catalytic wastewater treatment agent is directly subjected to pH value regulation together with wastewater, the pH value of wastewater is regulated to 3.0-6.0, more preferably 3.5-4.5, most preferably 3.5.

Preferably, when the pH value of wastewater is regulated to 3.0-6.0, the wastewater is hydrolyzed to produce a high-dispersion new ecological nano $TiO_2$ catalyst precipitate.

Preferably, when the pH value of wastewater is regulated to 3.0-6.0, the wastewater is hydrolyzed to produce the high-dispersion new ecological nano $TiO_2$ catalyst precipitate.

Preferably, when the pH value of wastewater is regulated to 3.0-6.0 and when air is blown for oxidation after the wastewater is hydrolyzed to produce the high-dispersion new ecological nano $TiO_2$ catalyst precipitate, a catalytic energy light source is increased.

Preferably, the light source is an artificial ultraviolet light source.

Preferably, the catalytic oxidation light source is sun light focused via a concave mirror.

Compared with the prior art, the principle and beneficial effects of the disclosure are as follows:

In the disclosure, byproduct diluted sulfuric acid from sulfate titanium white powder production and the titanium raw material are subjected to decomposition reaction, the contents of titanium sulfate and ferrous sulfate in the diluted sulfuric acid are controlled, and the wastewater treatment agent product for self-fitting nano catalytic decomposition of organic matters is prepared; the sulfuric acid and ferrous sulfate in the diluted sulfuric acid are used as commercial sulfuric acid and ferrous sulfate raw materials in the Fenton's organic wastewater treatment agent, thereby enlarging the use range and resource utilization value of the diluted sulfuric acid and reducing the raw material cost for Fenton wastewater treatment; the reaction for decomposing the titanium raw material with sulfuric acid is simple without expansive equipment and reaction conditions; the reaction product is subjected to cyclonic separation via the cyclone, the heavy phase bed charge is returned back to the reactive tanks to further react, thereby ensuring the complete decomposition and utilization rate of the titanium raw material.

In the disclosure, the self-fitting nano catalytic wastewater treatment agent product containing the soluble titanium sulfate component; in the regulation process of the pH value in wastewater treatment, new ecological nano $TiO_2$ is generated via dilution and hydrolysis along with concentration reduction of sulfuric acid; a special tedious production technology and complicated equipment as well as fussy operation procedures are not needed to produce nano $TiO_2$, all auxiliary materials sodium hydroxide, hydrochloric acid, deionized water and an adjuvant used in the production of the existing nano catalyst $TiO_2$ are not needed, and energy consumption required for drying and calcination does not need to be consumed. Since nano $TiO_2$ is generated by self-fitting reaction when wastewater treatment, all of production equipment and devices special for producing nano $TiO_2$ are eliminated.

In the disclosure, upstream and downstream for nano $TiO_2$ and wastewater treatment application are coupled utilizing a chemical reaction principle, and the wastewater treatment agent coupled with multiple components and multiple functions is prepared by adopting diluted sulfuric acid of sulfuric acid method titanium dioxide and a few amount of titanium raw material, thereby replacing and improving the existing raw materials and methods for Fenton wastewater treatment, exploring new application ways of diluted sulfuric acid from sulfate titanium white powder production, saving the usage amounts of commercial sulfuric acid and ferrous sulfate for Fenton wastewater treatment and fussy raw material preparation when in use; the cheap nano $TiO_2$ catalyst is generated by self fitting to open economic utilization market for catalytic decomposition of organic matters in wastewater with nano $TiO_2$, thereby achieving resource utilization and recycle, increasing the economic benefits of the producer; energy saving and cost reduction is significant, and economic benefits are obvious as well. Thus, in the disclosure, all of waste acids from sulfate titanium white powder production are creatively recycled, the production economic benefits are improved, and moreover, the traditional technology that nano $TiO_2$ preparation technology is tedious, equipment is complicated and fussy to operate, and economic production and use can not be achieved is simplified.

In the disclosure, the concentration range of the diluted sulfuric acid is 15-30%, most preferably 20-25%; in the reaction product solution, the content of titanium sulfate is 0.5-2.5%, most preferably 1.2-2.1%; the mass ratio [$H_2SO_4$/$Ti(SO_4)_2$] of sulfuric acid to titanium sulfate is 8.0-50, most preferably 10-20; in the reaction product solution, the content of ferrous sulfate is 5-15%, most preferably 9-12%; the mass ratio ($H_2SO_4$/$FeSO_4$) of sulfuric acid to ferrous sulfate is 1.5-3.5, preferably 2.0-2.5; the reaction temperature is 0-50° C., most preferably 20-35° C.; the ratio of the returned bed charge after cyclonic separation is 1.0-3.0%, most preferably 2%; the pH value of wastewater self-fitting precipitate nano $TiO_2$ is 3-6, most preferably 3.5-4.5.

Figure 1:
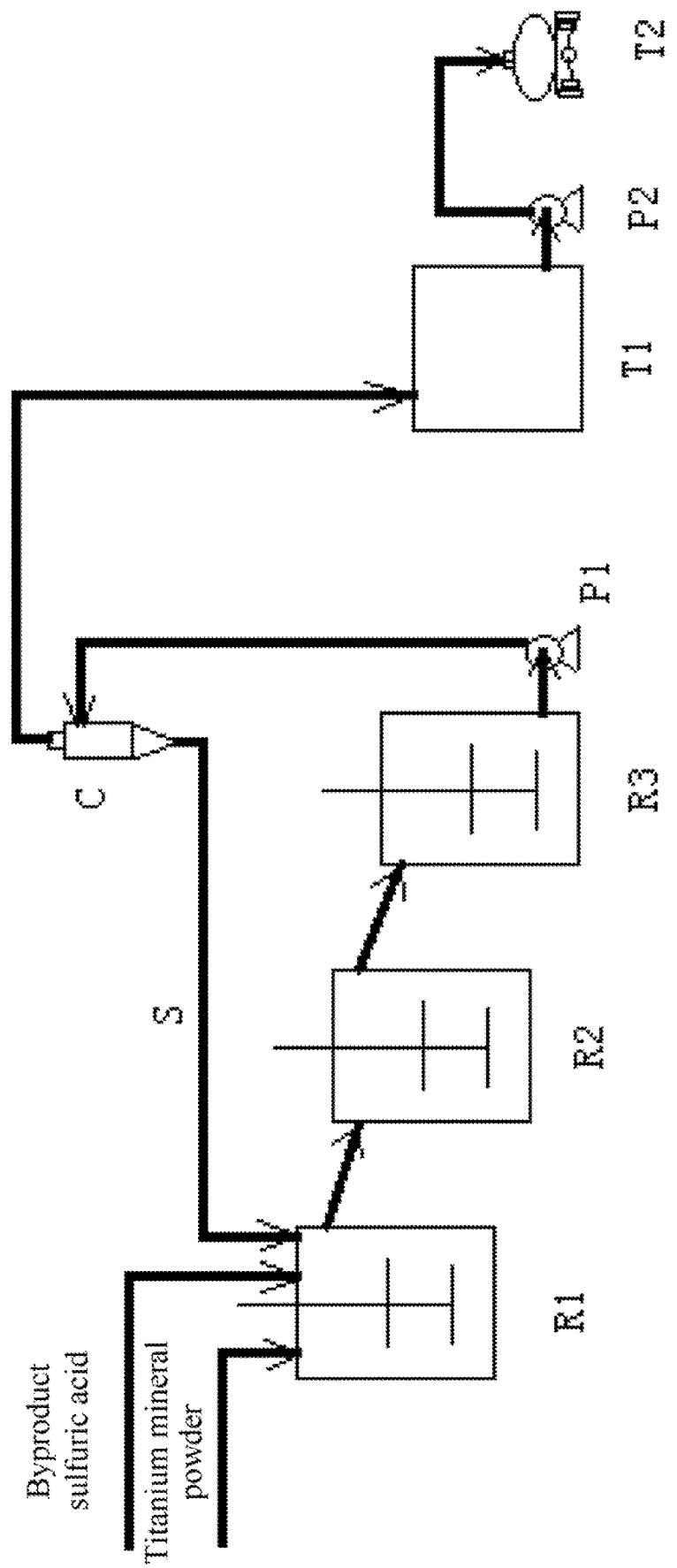
FIG. 1 is a production flowchart of a self-fitting nano catalytic wastewater treatment agent of the disclosure.
Figure 2:
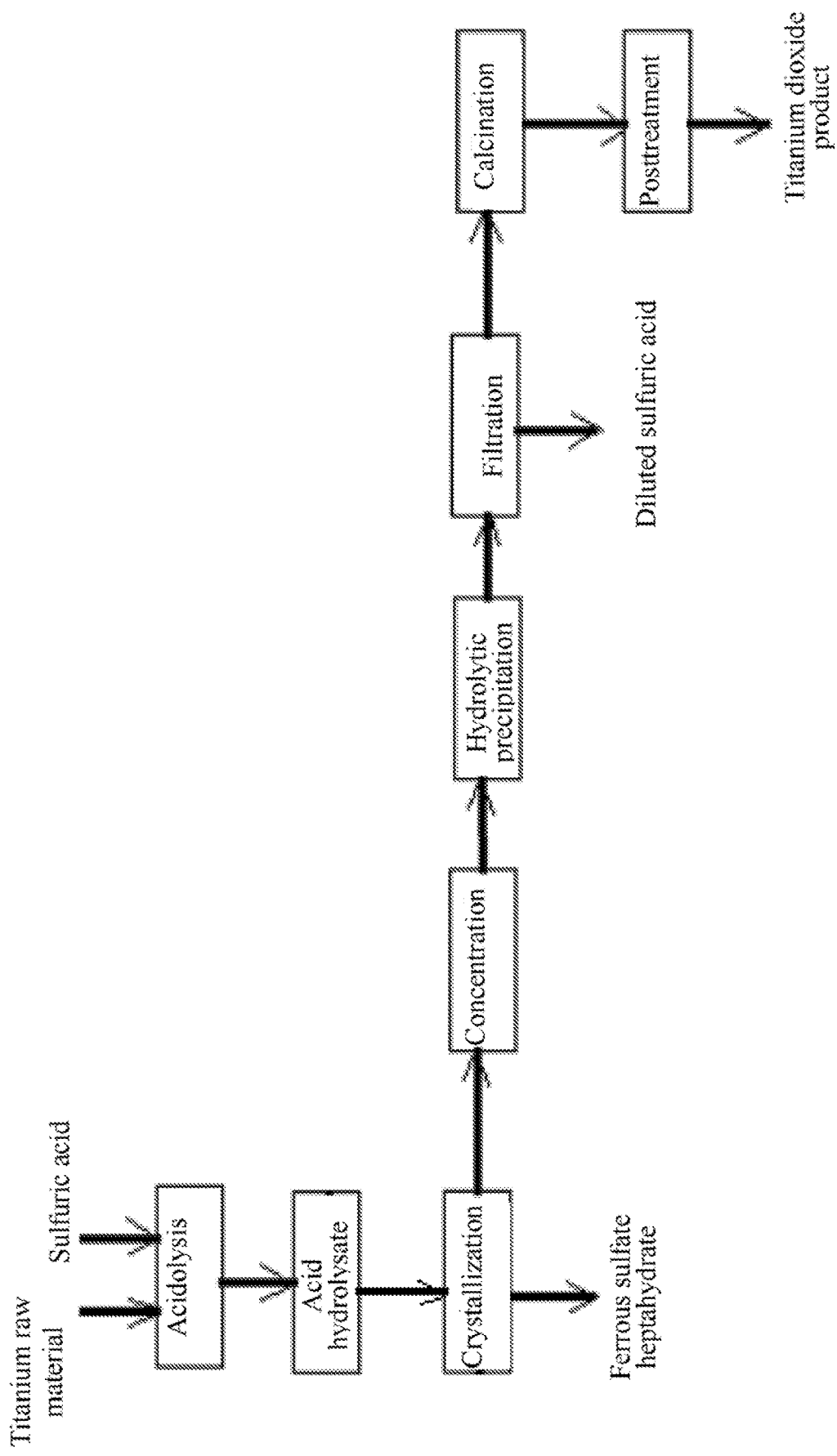

In the drawing, R1—first decomposition reactive tank; R2—second decomposition reactive tank; R3—third decomposition reactive tank;

P1—reaction material liquid deliver pump; P2—product wastewater treatment agent loading pump;

C—cyclone;

S—cyclonic liquid underflow returning material;

T1—product storage tank; T2—production transport truck;

FIG. 2 is a production flow diagram of sulfate titanium white powder.

DETAILED DESCRIPTION OF PREFERRED EMBODIMENTS

Example 1

As shown in FIG. 1, 13.4 t/h diluted sulfuric acid (see FIG. 2) (containing 23.3% of sulfuric acid, 10.70% of ferrous sulfate and 0.45% of titanium sulfate, see Table 1) from sulfate titanium white powder production, 134.0 kg/h ilmenite (compositions are seen in Table 2) and 268.0 kg slurry S returned back from underflow of a cyclone C are continuously added into the decomposition reactive tank R1, adversely flows to the reactive tank R2, and then adversely flows to the reactive tank R3; the standing time of the reactants is 2.5 h, and the temperature is 30° C. The material from the reactive tank R3 after complete reaction is fed to the cyclone C with the pump P1 for cyclonic separation, 268 kg of slurry S from underflow is returned back to the reactive tank R1 to further react together with newly added material, 13.534 tons of top flow is stored in the storage tank T1 as the self-fitting nano wastewater treatment wastewater agent, wherein, in the compositions of the product, the content of titanium sulfate is increased from 0.45% to 1.8% (see Table 3); the stored product is fed to the tank car T2 with the pump to be transported to the wastewater treatment station.

TABLE 2

Compositions Of Ilmenite

| | Components | | | | | |
|---|---|---|---|---|---|---|
| $TiO_2$ | Total FeO | FeO | $Fe_2O_3$ | MgO | CaO | $Al_2O_3$ |
| Compositions (%) 45.07 | 34.62 | 31.85 | 5.61 | 6.18 | 0.76 | 1.35 |

TABLE 3

Reaction Products

| Components | Contents (%) | Components | Contents (%) |
|---|---|---|---|
| $H_2SO_4$ | 23.08 | $MgSO_4$ | 1.39 |
| $FeSO_4$ | 11.43 | $Al_2(SO_4)_3$ | 0.71 |
| $Ti(SO_4)_2$ | 1.80 | $H_2SO_4$/$FeSO_4$ | 2.02 |
| $H_2SO_4$/$Ti(SO_4)_2$ | 12.82 | | |

Note:
the density of the dilute sulfuric acid is 1.342 g/cm$^3$.

Example 2

186 L/h nano catalytic wastewater treatment agent prepared in Example 1 is fed to a pH regulating pool of a 62 m$^3$/h dyeing wastewater pretreatment tank to down-regulate the pH value of wastewater to 3.60 from 10.26; in wastewater, the Fe$^{++}$ concentration of ferric sulfate is 3 mmol/L, and the concentration of nano $TiO_2$ is 0.3 mmol/L; water discharged from the regulation pool is fed to an oxidation reactive tank equipped with a UV-irradiation device, air is introduced for nano catalytic oxidation and decomposition, the discharged water is fed to an alkaline regulation pool to regulate the pH value of the treatment water to 8.0, and the flocculant is added for settling and separation. Wastewater treatment results are seen in Table 4.

TABLE 4

Pretreatment and Posttreatment Results of Wastewater in Example 1

| | Items | | | | | | |
|---|---|---|---|---|---|---|---|
| | pH | COD/ (mgL$^{-1}$) | BOD/ (mgL$^{-1}$) | SS/ (mgL$^{-1}$) | TP/ (mgL$^{-1}$) | TN/ (mgL$^{-1}$) | Chromaticity/ fold |
| Pretreatment | 10.26 | 1100 | 270 | 300 | 5 | 40 | 500 |
| posttreatment | 8.00 | 50 | 15 | 20 | 1 | 20 | 25 |

Example 3

186 L/h nano wastewater treatment agent prepared in Example 1 is fed to a pH regulating pool of a 62 m$^3$/h dyeing wastewater pretreatment tank to down-regulate the pH value of wastewater to 3.60 from 10.26; in wastewater, the Fe$^{++}$ concentration of ferric sulfate is 3 mmol/L, the concentration of nano $TiO_2$ is 0.3 mmol/L, and meanwhile 5 mmol/L hydrogen peroxide is added; water discharged from the regulation pool is fed to an oxidation reactive tank equipped with a UV-irradiation device, air is introduced for nano catalytic oxidation and decomposition, the discharged water is fed to an alkaline regulation pool to regulate the pH value of the treatment water to 8.0, and the flocculant is added for settling and separation. Wastewater treatment results are seen in Table 5.

TABLE 5

Pretreatment and Posttreatment Results of Wastewater in Example 2

| | Items | | | | | |
|---|---|---|---|---|---|---|
| pH | COD/ (mgL$^{-1}$) | BOD/ (mgL$^{-1}$) | SS/ (mgL$^{-1}$) | TP/ (mgL$^{-1}$) | TN/ (mgL$^{-1}$) | Chromaticity/ fold |
| Pre-treatment 10.26 | 1100 | 270 | 300 | 5 | 40 | 500 |
| post-treatment 8.00 | 40 | 10 | 20 | 1 | 15 | 20 |

Example 4

Comparative Example (Fenton's Reagent Method)

62 m³/h dyeing wastewater is fed to a pretreatment regulation pool and diluted sulfuric acid which is diluted by commercial sulfuric acid from 98% to 30% is added so that the pH value of wastewater is down-regulated to 3.60 from 10.26, water discharged from the regulation pool is fed to an oxidative reaction pool, ferric sulfate solution which is diluted to 30% via solid ferrous sulfate heptahydrate and 25% hydrogen peroxide solution are added to the oxidative decomposition pool, the Fe$^{++}$ concentration of ferric sulfate in wastewater is controlled to 6 mmol/L, and the concentration of H$_2$O$_2$ is controlled to 45 mmol/L, so as to carry out oxidative decomposition; discharged water obtained after oxidative decomposition is fed to alkaline regulation pool to regulate the pH value of treatment water to 8.0, and flocculant is added for settling and separation. Wastewater treatment results are seen in Table 6.

TABLE 6

Pretreatment and Posttreatment Results of Wastewater in Comparative Example

| | Items | | | | | |
|---|---|---|---|---|---|---|
| pH | COD/ (mgL$^{-1}$) | BOD/ (mgL$^{-1}$) | SS/ (mgL$^{-1}$) | TP/ (mgL$^{-1}$) | TN/ (mgL$^{-1}$) | Chromaticity/ fold |
| Pre-treatment 10.26 | 1100 | 270 | 300 | 5 | 40 | 500 |
| post-treatment 8.00 | 80 | 30 | 25 | 2 | 25 | 30 |

I claim:

1. A wastewater treatment method comprising:
preparation of a nano catalytic wastewater treatment agent
adding a diluted sulfuric acid and a titanium raw material into a reactive tank for a decomposition reaction; wherein the diluted sulfuric acid is a byproduct from production of sulfate titanium white powder;
feeding decomposed reaction materials into a cyclone for a cyclonic separation to obtain a heavy phase material and a light phase material;
charging the heavy phase material back to the reactive tank for another decomposition reaction, and feeding the light phase material into a storage tank; wherein the light phase material is used as the nano catalytic wastewater treatment agent;
feeding the nano catalytic wastewater treatment agent into a wastewater, regulating a pH value of the wastewater and producing a nano TiO$_2$;
carrying out an oxidative decomposition on the waste water which is pH-regulated and has produced the nano TiO$_2$;
regulating, by alkaline liquor, a pH value of a solution obtained after the oxidative decomposition, and
adding a flocculant into the regulated solution for sedimentation and obtain a clear liquid qualified for discharging.

2. The wastewater treatment method of claim 1, wherein, the diluted sulfuric acid is a waste sulfuric acid.

3. The wastewater treatment method of claim 1, wherein, the diluted sulfuric acid contains ferrous sulfate and a concentration range of the diluted sulfuric acid is 15-30%.

4. The wastewater treatment method of claim 1, wherein, the titanium raw material is selected from a group consisting of ilmenite, acid-soluble titanium slag, and an intermediate product in a sulfate titanium white production.

5. The wastewater treatment method of claim 1, wherein, the reactive tank is a single reactor having a stirrer or multiple reactors having stirrers.

6. The wastewater treatment method of claim 1, wherein, a mass ratio of the diluted sulfuric acid to the titanium raw material is 100:(0.5-2.0).

7. The wastewater treatment method of claim 1, wherein, a content of titanium sulfate in the nano catalytic wastewater treatment agent is 0.5-2.5% and the mass ratio of the diluted sulfuric acid to a titanium sulfate is 8.0-50.

8. The wastewater treatment method of claim 1, wherein, a content of ferrous sulfate in the nano catalytic wastewater treatment agent is 5-15%; and the mass ratio of the diluted sulfuric acid to a ferrous sulfate is 1.5-3.5.

9. The wastewater treatment method of claim 1, wherein, a temperature of the decomposition reaction is 0-50° C.

10. The wastewater treatment method of claim 1, wherein, the pH value of the wastewater is regulated to 3.0-6.0 when feeding the nano catalytic wastewater treatment agent into the wastewater.

11. The wastewater treatment method of claim 10, wherein, the wastewater is hydrolyzed to produce the nano TiO$_2$ with high-dispersion.

* * * * *